(12) United States Patent
Leonov et al.

(10) Patent No.: US 7,255,618 B2
(45) Date of Patent: Aug. 14, 2007

(54) SCREW DRIVE VEHICLE

(75) Inventors: Vladimir Leonov, San Pedro, CA (US); Ong Kenlip, Singapore (SG)

(73) Assignee: Mattel, Inc., El Segundo, CA (US)

( * ) Notice: Subject to any disclaimer, the term of this patent is extended or adjusted under 35 U.S.C. 154(b) by 0 days.

(21) Appl. No.: 11/284,417

(22) Filed: Nov. 21, 2005

(65) Prior Publication Data

US 2006/0160442 A1   Jul. 20, 2006

Related U.S. Application Data

(60) Provisional application No. 60/519,324, filed on Nov. 12, 2003.

(51) Int. Cl.
B63H 1/38 (2006.01)
(52) U.S. Cl. .......................... 440/98; 180/7.2
(58) Field of Classification Search ................ 180/7.2; 440/48, 98, 99, 6, 12.65, 5; 114/61.1, 61.5–61.19, 114/59, 123
See application file for complete search history.

(56) References Cited

U.S. PATENT DOCUMENTS

| | | | |
|---|---|---|---|
| 635,501 A | 10/1899 | Morath |
| 669,210 A | 3/1901 | Burch |
| 780,375 A | 1/1905 | Nelson |
| 864,106 A | 8/1907 | Peavey |
| 864,108 A | 8/1907 | Sands |
| 997,385 A | 7/1911 | Francescatti |
| 1,069,875 A | 8/1913 | Hollis |
| 1,134,670 A | 4/1915 | Cizek |
| 1,211,345 A | 1/1917 | Petersen |
| 1,254,479 A | 1/1918 | Chisholm |
| 1,258,496 A | 3/1918 | Stowell |
| 1,269,028 A | 6/1918 | White |
| 1,303,764 A | 5/1919 | Broadway |
| 1,646,611 A | 10/1927 | Code |

(Continued)

FOREIGN PATENT DOCUMENTS

GB      1349512      4/1974

(Continued)

OTHER PUBLICATIONS

"Transport and handling vehicles" obtained from www.nntu.sci-nnov.ru/NTSU/Amf/nir_tran.htm.

(Continued)

*Primary Examiner*—Ed Swinehart
(74) *Attorney, Agent, or Firm*—Akin Gump Strauss Hauer & Feld LLP (57) ABSTRACT

A screw drive vehicle has a main housing with forward and aft ends and first and second lateral sides. A first support arm rotatably supports a first pontoon assembly from the first lateral side of the main housing. A second support arm rotatably supports a second pontoon assembly from the second lateral side of the main housing. A reversible motor in the housing simultaneously rotates the support arms from positions parallel to one another and the main housing to non-parallel positions. Each pontoon assembly includes a tubular housing with exterior screw thread supported for rotation between distal ends of the arm and a reversible pontoon drive motor operably coupled with the tubular housing so as to rotate the housing and thread in a selected rotational direction.

24 Claims, 8 Drawing Sheets

U.S. PATENT DOCUMENTS

| | | | | |
|---|---|---|---|---|
| 1,685,702 | A | 9/1928 | Breen | |
| 1,731,493 | A | 10/1929 | Harris | |
| 1,833,114 | A | 11/1931 | Holtzman | |
| 2,093,320 | A * | 9/1937 | Hunt | 114/61.19 |
| 2,154,191 | A | 4/1939 | Welsh | |
| 2,254,320 | A | 9/1941 | Russell | |
| 2,706,958 | A | 4/1955 | Cutting et al. | |
| 3,059,711 | A | 10/1962 | Becker | |
| 3,169,596 | A | 2/1965 | Wright | |
| 3,224,407 | A * | 12/1965 | Bertrand | 440/12.65 |
| 3,250,239 | A | 5/1966 | Garate | |
| 3,333,563 | A | 8/1967 | Bakker | |
| 3,369,514 | A | 2/1968 | Cockerell | |
| 3,395,641 | A | 8/1968 | Frost | |
| 3,395,671 | A | 8/1968 | Zimmerman, Jr. | |
| 3,397,668 | A | 8/1968 | Mainguy | |
| 3,405,777 | A | 10/1968 | Kemenczky | |
| 3,418,960 | A | 12/1968 | Nelson | |
| 3,420,326 | A | 1/1969 | Kusmer | |
| 3,466,798 | A | 9/1969 | Speers et al. | |
| 3,514,962 | A | 6/1970 | Poole | |
| 3,682,127 | A * | 8/1972 | Waquet | 440/12.65 |
| 3,707,938 | A | 1/1973 | Olson | |
| 3,746,112 | A | 7/1973 | Ilon | |
| 3,768,821 | A | 10/1973 | Adams | |
| 3,981,259 | A * | 9/1976 | Harper, Jr. | 114/61.15 |
| 4,167,830 | A | 9/1979 | Ogawa | |
| 4,286,533 | A | 9/1981 | Sanner | |
| 4,294,184 | A | 10/1981 | Heinrich | |
| 4,338,043 | A | 7/1982 | Biancale et al. | |
| 4,400,115 | A | 8/1983 | Biancale et al. | |
| 4,476,948 | A | 10/1984 | Komoto et al. | |
| 4,734,067 | A | 3/1988 | Ellias-Reyes | |
| 4,857,022 | A | 8/1989 | Slonim | |
| 4,867,716 | A | 9/1989 | McFarland | |
| 5,203,274 | A | 4/1993 | Hart et al. | |
| 5,203,729 | A | 4/1993 | Beller et al. | |
| 5,392,871 | A | 2/1995 | McFarland | |
| 5,492,436 | A | 2/1996 | Suksumake | |
| 5,509,370 | A | 4/1996 | Kovacs et al. | |
| 5,525,090 | A | 6/1996 | Halford et al. | |
| 5,580,296 | A | 12/1996 | Chow | |
| 5,581,932 | A | 12/1996 | Bell | |
| 5,643,041 | A | 7/1997 | Mukaida | |
| 5,701,966 | A | 12/1997 | Amico | |
| 6,280,284 | B1 | 8/2001 | Winefordner et al. | |
| 6,340,065 | B1 | 1/2002 | Harris | |
| 6,349,781 | B1 | 2/2002 | Kruse | |
| 6,394,203 | B1 | 5/2002 | Harris | |
| 6,477,730 | B1 | 11/2002 | Marrero | |
| 6,547,339 | B2 | 4/2003 | Bandou et al. | |
| 6,547,340 | B2 | 4/2003 | Harris | |
| 6,865,997 | B2 * | 3/2005 | Stephens | 114/144 A |
| 6,966,807 | B2 * | 11/2005 | Leonov et al. | 440/98 |

FOREIGN PATENT DOCUMENTS

JP    55-148665    * 11/1980

OTHER PUBLICATIONS

Provisional Patent Application (attached); Express Mail No,; EV 662716273US filed May 11, 2005 entitled "Screw Drive Vehicle"; Dexter Liu, inventor.

Proceedings of the ANS Seventh Topical Meeting on Robotics and Remote Systems, vol. 1 Published by the American Nuclear Society, Inc. (1997), cover and pp. 352-359.

* cited by examiner

SCREW DRIVE VEHICLE

CROSS-REFERENCE TO RELATED APPLICATIONS

This application claims benefit of U.S. Provisional Application 60/519,324 "Screw Drive Vehicle," filed Nov. 12, 2003, which is entirely incorporated by reference herein.

BACKGROUND OF THE INVENTION

The present invention relates generally to screw drive vehicles. It is believed that a screw drive vehicle having a new steering mechanism and a new drive mechanism would be desirable. It is further believed that an operational screw drive vehicle of miniaturized dimensions and capable of being remotely controlled would be especially desirable for use as a toy.

BRIEF SUMMARY OF THE INVENTION

Briefly, a screw drive vehicle comprises a main housing having a forward end and an aft end, first and second lateral sides and a central longitudinal axis extending through the forward and aft ends, at least one electric power source supported by the main housing; a first pontoon assembly having a central longitudinal axis, a first support arm connecting the first pontoon assembly to the first lateral side of the main housing, a second pontoon assembly having a central longitudinal axis and a second support arm connecting the second pontoon assembly to the second lateral side of the main body. Each pontoon assembly includes a rotatable housing supported for rotation from the support arm and having at least one screw thread extending generally radially outwardly from an exterior surface of the housing. Each pontoon assembly includes a reversible, electrically powered pontoon drive motor operatively coupled with the at least one electric power source and operably coupled with the rotatable housing so as to rotate the housing in a selected rotational direction. Each pontoon drive motor is operable separately from the other pontoon drive motor.

A screw drive vehicle comprising: a main housing having a forward end and an aft end, first and second lateral sides and a central longitudinal axis between the forward and aft ends; at least one electric power source; a first pontoon assembly having a central longitudinal axis; a first support arm connecting the first pontoon assembly to the first lateral side of the main housing, the first support arm capable of moving the first pontoon assembly from a position parallel to the main housing to a non-parallel position; a second pontoon assembly having a central longitudinal axis; a second support arm connecting the second pontoon assembly to the second lateral side of the main body, the second support arm capable of moving the second pontoon assembly from a position parallel to the main housing to a non-parallel position; and at least one pontoon drive motor operably coupled with at least one of the first and second pontoon assembly; a steering motor supported by the main housing and operably coupled to the at least one electric power source and with the first and second support arms, wherein the steering motor pivots the first and second support arms from a first operating configuration wherein the longitudinal axes of the first and second pontoon assemblies are generally parallel to the central longitudinal axis of the main housing to at least another operating configuration wherein the longitudinal axes of the first and second pontoon assemblies intersect.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings three embodiments which are presently preferred. It should be understood, however, that the invention is not limited to the precise arrangements and instrumentalities shown. In the drawings.

DETAILED DESCRIPTION OF THE INVENTION

Certain terminology is used in the following description for convenience only and is not limiting. The words "right", "left", "top", and "bottom" designate directions in the drawings to which reference is made. The words "interior" and "exterior" refer to directions toward and away from, respectively, the geometric center of the screw drive vehicle and designated parts thereof. The terminology includes the words above specifically mentioned, derivatives thereof and words of similar import.

Referring to the figures, wherein like numerals are used to indicate like elements throughout, there is shown in FIGS. 1-5, the preferred embodiment of a screw drive toy vehicle, generally designated 10, in accordance with the present invention. The screw drive vehicle 10 includes a main housing 20 located centrally between two preferably identical screw drive pontoon assemblies 70, a left pontoon assembly 70a and a right pontoon assembly 70b. The main housing 20 has a forward end 22, a rearward or aft end 24 and first and second lateral sides 26, 28 as well as a central longitudinal axis 20a extending through the ends 22, 24. Each of the pontoon assemblies 70a, 70b has a center rotating portion 80a, 80b, respectively, and sometimes collectively referred to herein as simply 80. Each of the pontoons 70a, 70b and its center rotating portion 80a, 80b has a central longitudinal axis 80a', 80b', respectively which is also an axis of rotation of the portion. The pontoon assemblies 70 are further rotatably attached to the main housing 20. The term "housing" is intended to broadly cover conventional body and frame (or chassis) combinations like vehicle 10 as well as other conventional constructions such as but not limited to a monocoque or pairs of molded half shells, which support and partially enclose other components of the vehicle.

Figure 1:
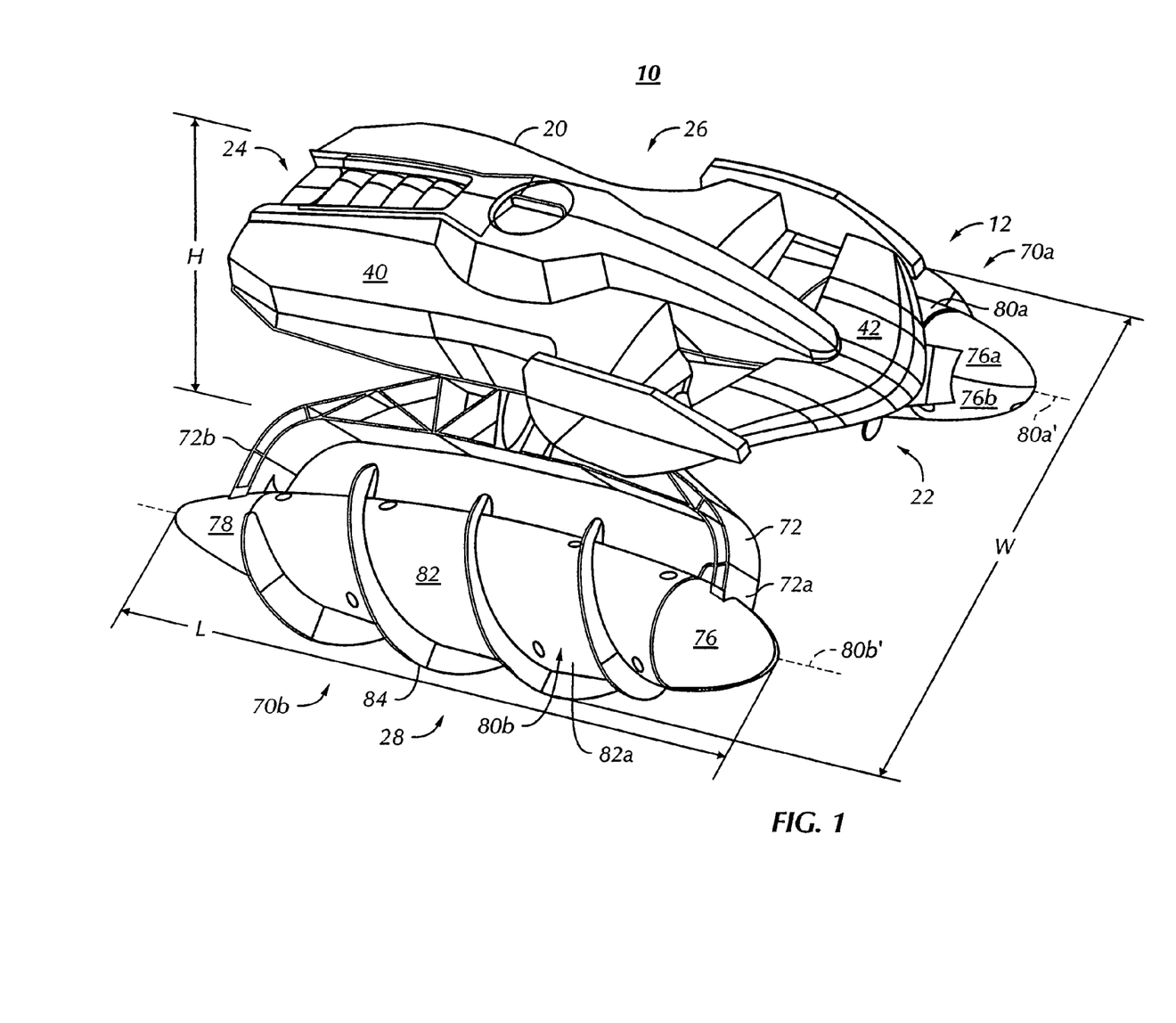
FIG. 1 is a forward right side perspective view of a screw drive vehicle in accordance with the preferred embodiment of the present invention.
Figure 2:
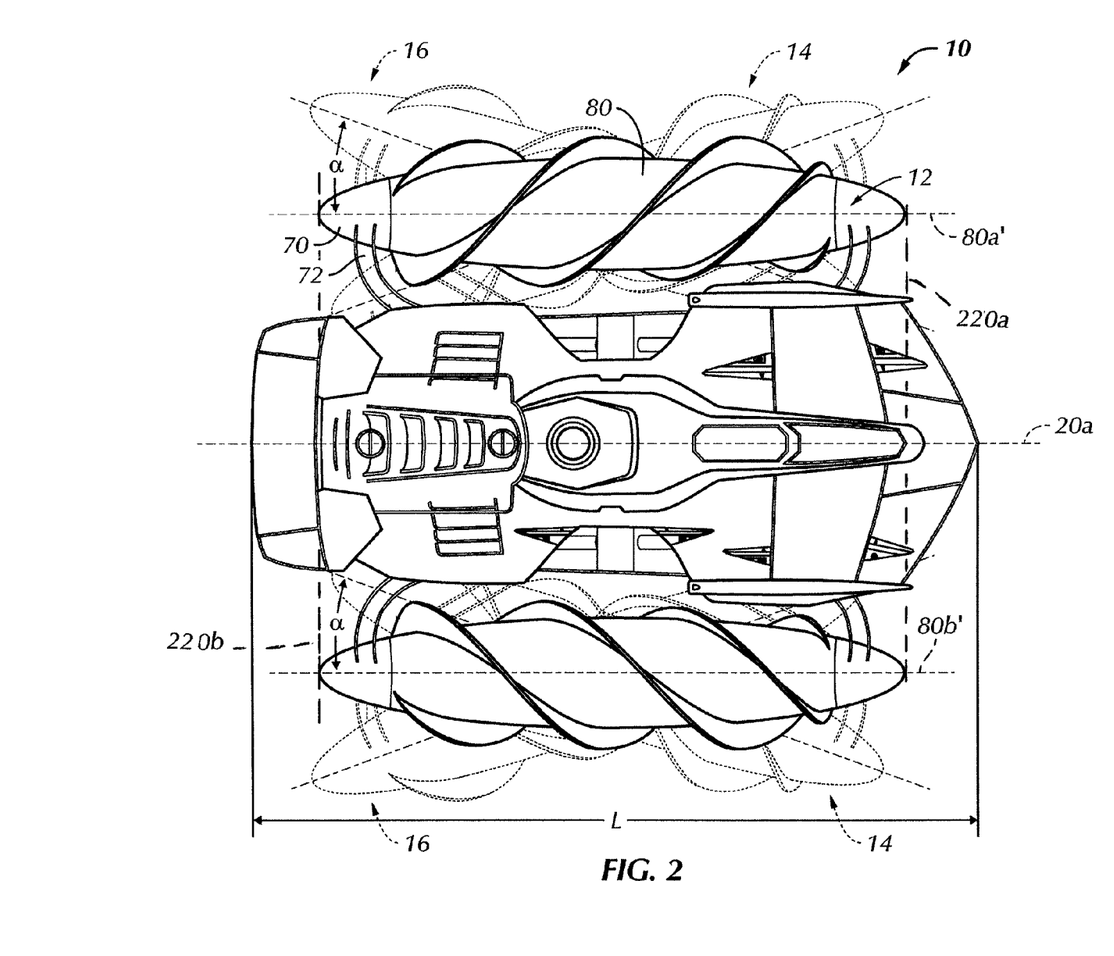
FIG. 2 is a top plan view of the screw drive vehicle of FIG. 1, showing the screw drive vehicle in first, second and third operating configurations.

The screw drive vehicle 10 preferably has three operating configurations: a first operating configuration 12, which is illustrated in FIG. 1 and in solid FIG. 2, wherein the pontoons 70a, 70b and pontoon longitudinal axes 80a', 80b', are generally parallel to one another and the main housing and central longitudinal axis 20a of the main housing 20. By implication, all three axes 20a, 80a', 80b' are mutually perpendicular to any vertical plane perpendicular to any one of them. Because the pontoon assemblies 70a, 70b are preferably mirror images and symmetrically positioned on either side of the main housing 20 and central longitudinal axis 20a (see FIGS. 2-4, 8a-8d and 9a-9b), vertical planes represented by broken lines 220a and 220b extending between the forward ends and the aft ends of the first and second pontoon assemblies 70a, 70b, respectively, are perpendicular to the plane of the figure and to each of the pontoon central axes 80a', 80b' and to the central axes 20a, as illustrated in FIG. 2. In a second operating configuration 14, illustrated in phantom in FIG. 2, the pontoons 70a, 70b and pontoon longitudinal axes 80a', 80b' are generally angled with respect to the main housing and its longitudinal axis 20a and with respect to one another such that the pontoon longitudinal axes 80a', 80b' intersect at a point aft of the main housing 20. In a third operating configuration 16, also illustrated in phantom FIG. 2, the pontoons 70a, 70b and the pontoon longitudinal axes 80a', 80b' are angled with respect to the main housing and its central longitudinal axis 20a and also with respect to one another such that the pontoon longitudinal axes 80a', 80b' intersect at a point forward of the main housing 20, effectively reversing the second operating configuration 14.

With reference now to FIG. 1, the screw drive vehicle 10 has an overall width W, an overall height H and an overall length L. In the preferred embodiment shown, overall width, height and length, W, H, and L, are all sufficiently small, suggestedly 16 inches (about 60 cm) and desirably each less than about 24 inches (about 40 cm), so that the vehicle 10 can be hand-carried and could not be ridden by a child. Thus, in the embodiment shown, the screw drive vehicle 10 is of sufficiently diminutive size preferably about 12 inches (about 30 cm) in length to be especially well-suited for use as a toy.

The left and right pontoon assemblies 70a and 70b, respectively, are preferably mirror images of one another, and preferably comprise identical components. For brevity, similar components of the right and left pontoon assemblies 70a and 70b will be assigned similar reference numerals, and generally right and left hand versions of similar components will not be distinguished. It should be appreciated that center assemblies are preferably identical to one another and merely reversed in direction in the pontoon assemblies 70a, 70b.

Figure 3:
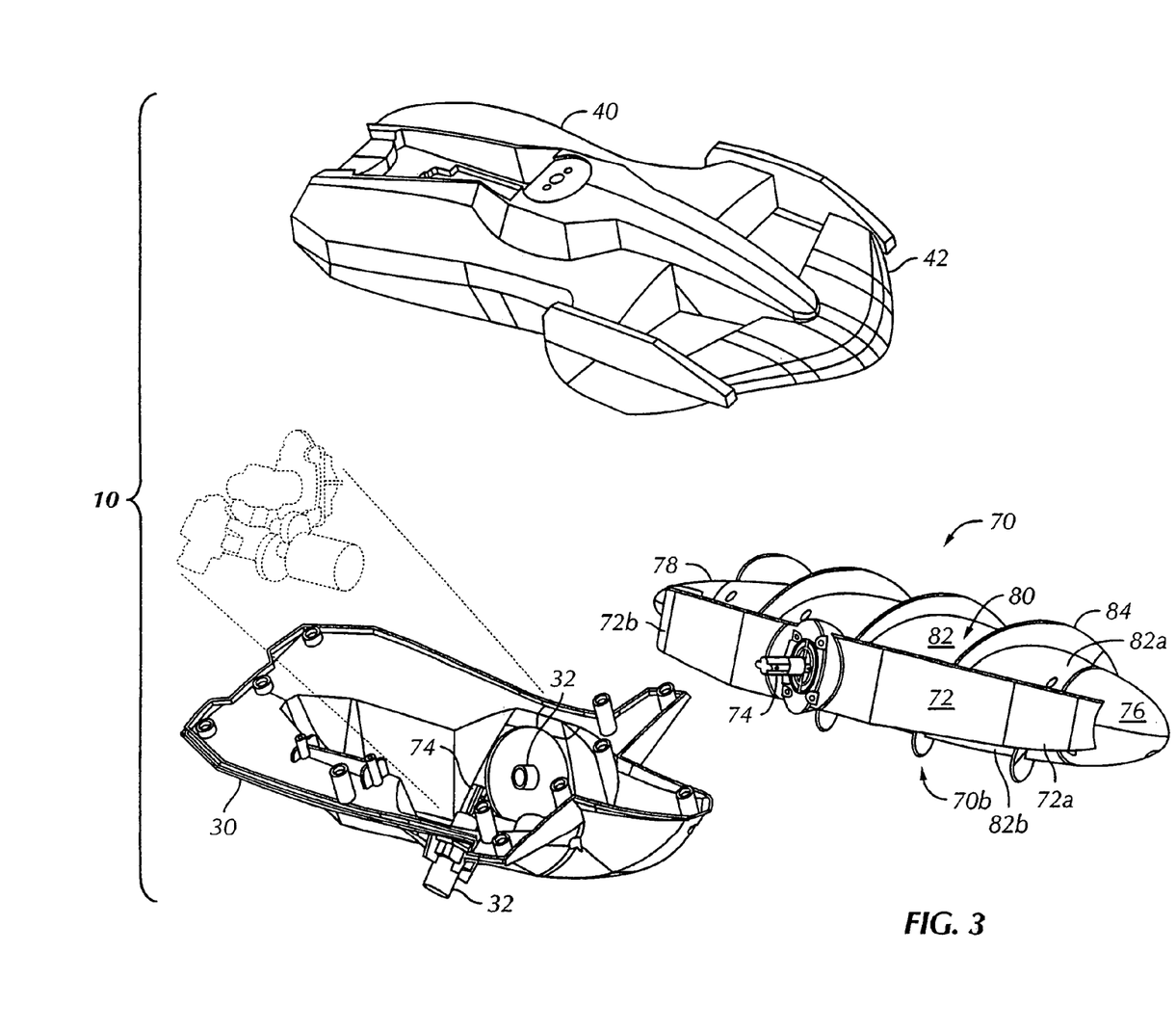
FIG. 3 is a partially exploded view of a body portion and a side perspective view of the left pontoon assembly of the screw drive vehicle of FIG. 1.

With particular reference now to FIG. 3, the depicted main housing 20 comprises a lower housing 30 and an upper housing 40. In the preferred embodiment shown, the lower housing 30 preferably supports a reversible, electrically-powered steering motor 50. The steering motor 50 is operatively connected by control circuitry 200 (FIG. 6) to an electrical power source 210 (see FIG. 6). The lower housing 30 preferably includes a main axle bushing 32 adapted to receive rotation main axles 74 projecting from each pontoon support arm 72. The lower housing 30 further includes approximate bracketry and/or framing for rotatably supporting left and right sector worm gears 54 and 56, in proper alignment with a steering worm 52 described in detail later herein. Each of the sector worm gears 54, 56 preferably includes a main axle receptacle (not shown) adapted to receive and drivingly mate or engage with the main axle 74 of one of the support arms 72. The upper housing 40 connects to the lower housing 30. The upper housing 40 may include features such as an airfoil 42 at the forward end 22. Additional coverings may be provided inside main housing 20 to protect the circuitry, steering motor and gear drives.

Figure 5:
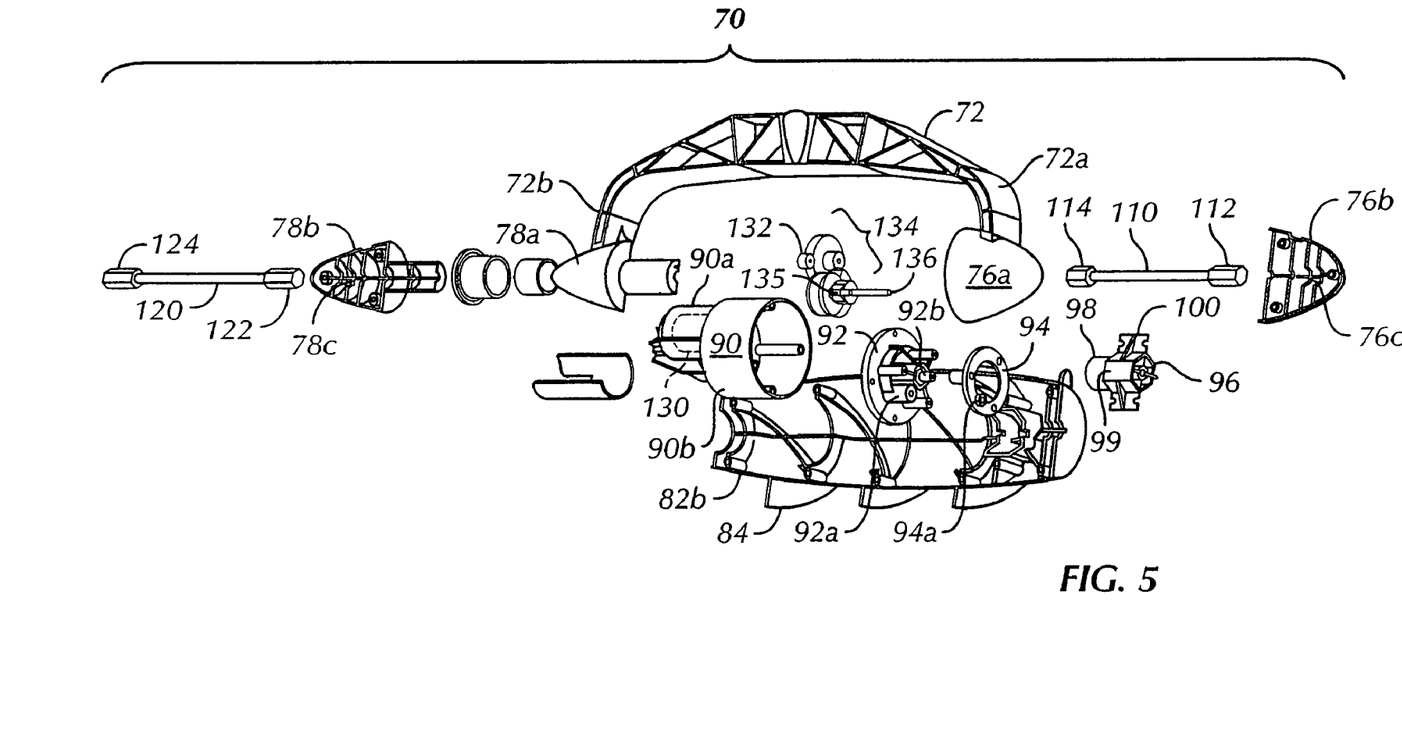
FIG. 5 is an exploded view of a right pontoon assembly of the screw drive vehicle of FIG. 1.

With reference to FIG. 5, the parts of the left pontoon assembly 70a are shown. Each pontoon assembly 70 includes a pontoon support arm 72 having a forward end 72a and an aft end 72b. In the preferred embodiment, the support arm forward end 72a fixedly connects to a forward end cap 76, while the support arm aft end 72b fixedly connects to an aft end cap 78. The main axle (74 in FIG. 2) is fixedly connected to the support arm 72 at a point intermediate the forward and aft ends 72a, 72b.

Figure 4:
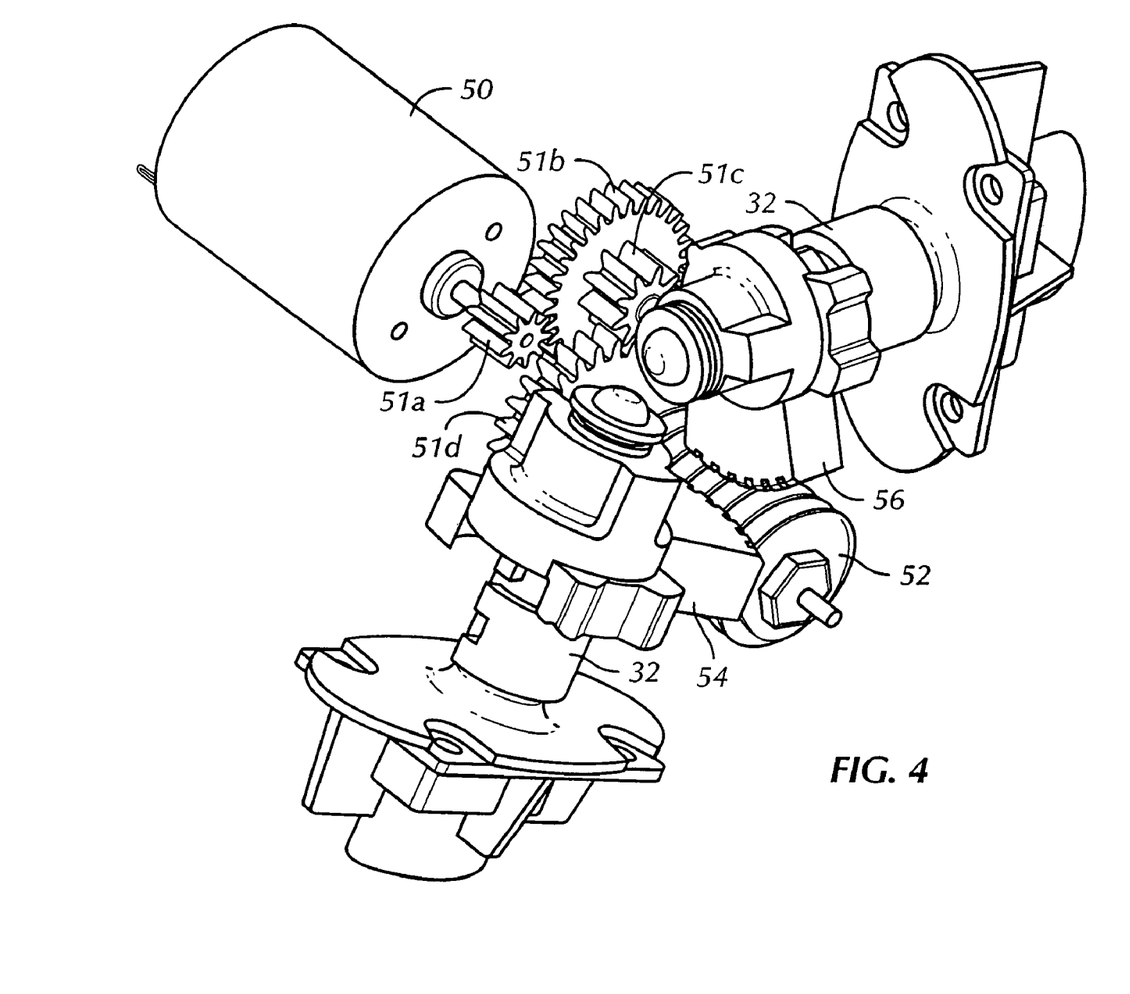
FIG. 4 is a detailed view of the steering motor drive.

Referring to FIGS. 2-4, the pontoon assemblies 70 may be rotated relative to the housing 20 preferably by operation of the steering motor 50. Through pinion 51a and reduction spur gears 51b-51d, the steering motor 50 turns the worm 52 to simultaneously turn left and right sector worm gears 54, 56, in turn rotating the main axles 74, the pontoon support arms 72 and the pontoon assemblies 70. Each sector worm gear 54, 56, main axle 74 and main axle bushing 32 on each side of the screw drive vehicle 10 collectively define a steering gear drive system. The pontoon assemblies 70 are preferably rotatable over a desired angular range α, for example about + or −20 degrees from the first operating configuration 12, moving between the first operating configuration 12 and each of the second operating configuration 14 and third operating configuration 16, respectively.

Each center rotating portion 80 is preferably rotatably coupled to and between the forward end cap 76 and aft end cap 78. Each center rotating portion 80 preferably includes a rotatable housing 82 having a generally cylindrical or frusto-ovoid shape supported for rotation from the support arm 70. Screw threads 84 extend generally radially outwardly from and helically along an exterior surface of the center housing 82 and twist in a helical in opposing directions on each pontoon assembly 70a and 70b.

With reference now to FIG. 5, further details regarding pontoon assembly 70 construction are shown. The depicted forward end cap 76 is formed by a first shell portion 76a and a second shell portion 76b. Similarly, the aft end cap 78 is formed by a first shell portion 78a and a second shell portion 78b. Forward and aft end cap interior receptacles 76c and 78c are formed within interior portions of the forward and aft caps 76, 78. The function of the interior receptacles 76c and 78c is described in detail later herein. Each rotatable housing 82 preferably is formed from housing first shell 82a (FIG. 1) and second shell 82b. One of ordinary skill in the art would recognize that the pontoon assemblies 70 could be constructed in other ways so long as the necessary components can fit and function properly within the pontoon assembly.

A motor and gearbox housing 90 is preferably fixedly supported within the center rotating portion 80 and housing 82. Pontoon drive motor 130 (phantom) is supported within a motor housing portion 90a, while a pontoon reduction gear drive train 134 is housed in a gearbox housing portion 90b. A housing lid 92 connects to the motor and gearbox housing 90, along with a housing retaining ring 94 that includes a retaining ring shaft bushing 94a. The housing lid 92 includes an output shaft bushing 92a for use with an output shaft 136 described later herein. The housing lid 92 further includes a receptacle 92b, shown in this preferred embodiment to be hexagonally-shaped. Function of the receptacle 92bis described below herein.

The motor and gearbox housing 90 is preferably supported and fixed against rotation with respect to the end caps 76, 78 by forward and aft support shafts 110, 120. Each support shaft 110, 120 has a respective non-cylindrical first end 112, 122 and a respective non-cylindrical second end 114, 124. The first end 112 of the forward support shaft 110 is non-rotatably received within a mating, non-cylindrical forward end cap interior receptacle 76c, while the second end 114 is non-rotatably received in a mating, non-cyclindrical housing lid receptacle 92b. Similarly, the first end 122 of the aft support shaft 120 is non-rotatably received in a mating, non-cylindrical receptacle (not shown) in the aft end of the motor and gearbox housing 90, while the second end 124 is non-rotatably received in a mating, non-cylindrical aft end cap interior receptacle 78c.

Center rotating portions 80a and 80b of the left and right pontoon assemblies 70a and 70b, respectively, are separately and preferably independently driven for either clockwise or counterclockwise rotation by reversible, electrically-powered left and right drive motors, 130a and 130b (see FIG. 6), respectively, fixedly and non-rotatably supported in each rotatable housing 82. Electrically, the drive motors 130 are operatively coupled through controller 208 with electrical power source 210 and each is operably coupled with the rotatable housing 82 so as to rotate the housing 82 in a selected rotational direction. Mechanically, a drive motor pinion 132 is operatively connected to an output shaft of each drive motor 130 and is further operatively engaged with a pontoon reduction drive gear train 134. The pontoon drive gear train 134 terminates with an output shaft 136, upon which is mounted an output shaft pinion 135. The output shaft 136 extends through the housing lid shaft bushing 92a and the retaining ring shaft bushing 94a. The output shaft pinion 135 operatively engages a spur gear 98 fixedly connected to a pontoon drive member 96. The pontoon drive member 96 is fixedly mounted to forward support staff 110 for rotation with shaft 110. The pontoon drive member 96 includes a hexagonal or other non-cylindrical body 99 with side extensions 100, which fixedly secure the member 96 to the center housing 82 for rotation of the center housing 82 by the member 96. Thus, as the drive motor 130 turn, the drive motor pinion 132, the output shaft 136 rotates the spur gear 98, in turn rotating the pontoon drive member 96 and the center housing 82.

Figure 6:
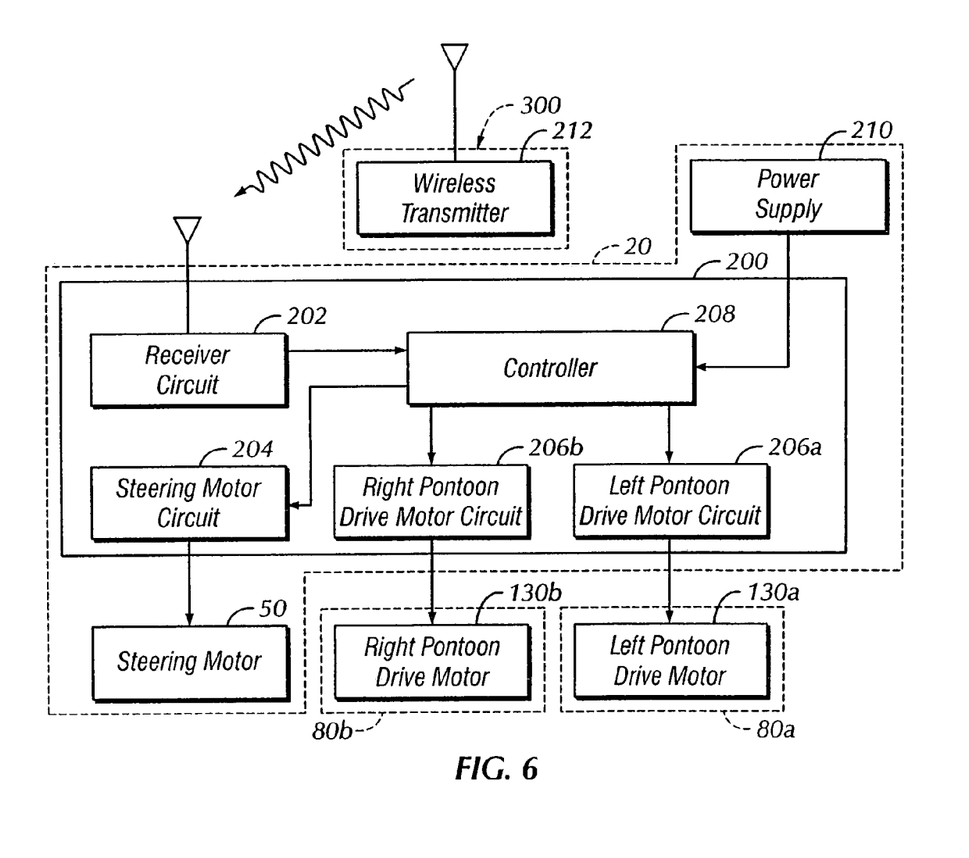
FIG. 6 is a block diagram illustrating electrical and electro-mechanical components of the screw drive vehicle of FIG. 1.

Electronic control of the screw drive vehicle 10 is straight forward. Referring to FIG. 6, the toy vehicle 10 preferably includes control circuitry 200 preferably mounted to a circuit board (not depicted) in housing 20. The control circuitry 200 includes a receiver circuit 202 for receiving signals from a wireless transmitter 212, an operator remote control unit 300, a steering motor control circuit 204, left pontoon motor control circuit 206a and right pontoon motor control circuit 206b, all operatively coupled with and together through a central processor 208. The power source 210 is preferably a rechargeable battery. The motor control circuits 204, 206a, 206b are configured to provide reversible current through the steering motor 50 and each pontoon motor 130a, 130b separately and independently of one another. Current is preferably supplied between the main housing 20 and each of the pontoons 70a, 70b, through hard wires, slip rings, shoes and brushes or the like. Conventional non-rechargeable batteries (not depicted) may be used.

Figure 7:
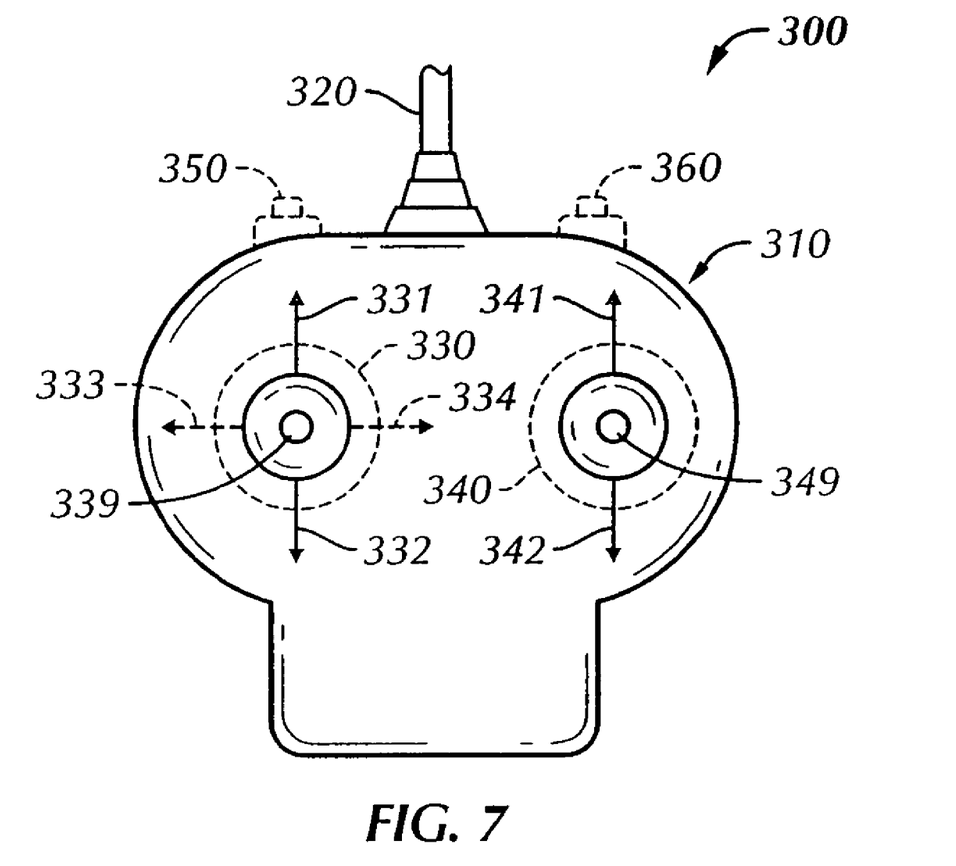
FIG. 7 depicts two possible hand control unit configuration.

FIG. 7 depicts diagrammatically an operator remote control unit indicated generally at 300. The unit 300 includes a hand held housing 310 with a pair of switches 330, 340 (in phantom) inside the housing 310. An antenna 320 may be provided if radio control is employed. An IR LED or other light source (neither depicted) could be substituted for optical control, a sound source (not depicted) for sonic control. Switches 330, 340 might be provided with manual actuators in the form of joy sticks 339, 349, respectively, biased to self-center into a neutral position (depicted) generally perpendicular to the upper surface of the housing 310 when released.

Figure 8A:
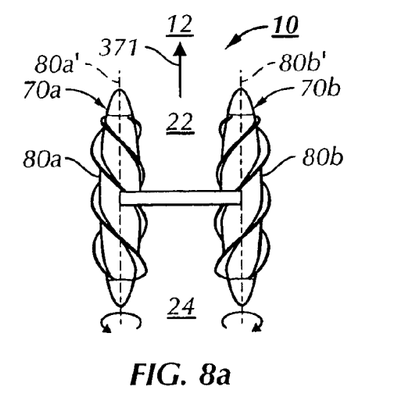
FIGS. 8a-8d are schematic drawings showing movement of the vehicle under different pontoon drive operations and on different surfaces.
Figure 8B:
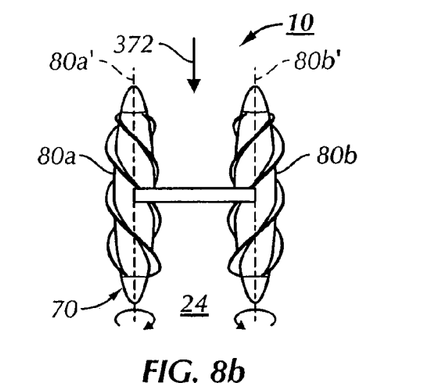
Figure 8C:
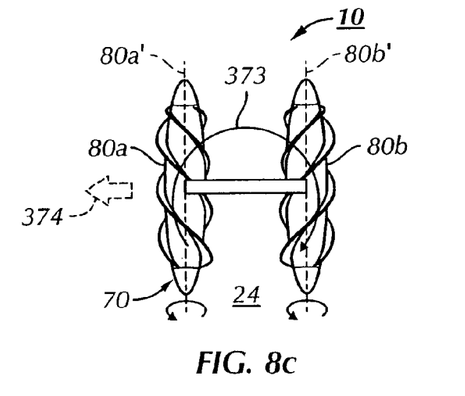
Figure 8D:
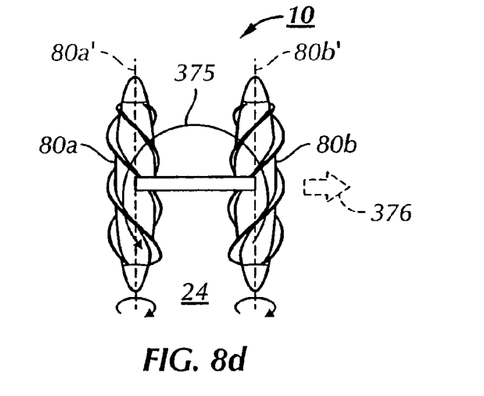

Vehicle control through switches 330, 340 might be implemented in at least two different ways. Switches 330, 340 may be configured to toggle in two directions away from the central neutral position such as, for example, in a forward direction as indicated by arrows 331, 341, and a rearward direction as indicated by arrows 332, 342. This configuration would provide separate and fully independent operator control of the operation and rotational direction of each of the center assemblies 80a and 80b of each pontoon 70. The central processor 208 would be configured, for example, to respond to signals from the control unit 300 indicating both switches 330, 340, being moved in a forward direction 331, 341 to cause the vehicle 10 to move forwardly in the direction of arrow 371 in FIG. 8a. Similarly, signals from the unit 300 indicating the switches 330, 340 have been moved in a rearward direction 332, 342 would cause the pontoon center portions 80a, 80b to be driven in a manner to move the vehicle rearwardly in the direction of arrow 372 in FIG. 8b. Where the center portions 80a and 80b are mirror images of one another, forward and rearward movement of the vehicle 10 requires each center portion 80a, 80b to be driven in an opposite rotational direction from the other as is shown in FIGS. 8a and 8b. Moving joystick 339 of switch 330 in a forward direction 331 and joystick 349 of switch 340 in a rearward direction 342 would cause a counterclockwise rotation of each of the center sections 80a, 80b when viewed from the aft end as shown in FIG. 8c. Reversing the direction of the switches (i.e. moving the first switch joystick 339 in a rearward direction 332 and that of the second switch 340 in a forward direction 341) would cause the center sections 80a, 80b to rotate in the same clockwise direction when viewed from the aft end of the vehicle 10 as shown in FIG. 8d. In this configuration of unit 300, two additional switches, indicated in phantom at 350 and 360 in FIG. 7, which can be, for example, button operated momentary contact switches, can be provided to control operation of the steering motor 50 to cause either the front ends of the pontoons 70 to be rotated toward one another into the second operating configuration 14 (for example, through depression switch 350) or the rearward ends of the pontoons 70 to be brought together into the third operating configuration 16 (i.e. through depression switch 360). The vehicle 10 would normally be in the first configuration 12 until one of two switches 350, 360 were depressed and would return to that configuration when the switch 350 or 360 is released. Such configuration of the operator remote control unit 300 gives the operator separate and fully independent control of all three reversible motors 50, 130a and 130b. Additionally, the vehicle 10 can be steered by varying the relative speed of rotation of the pontoon center sections 80a, 80b, including the driving of only one of the pontoon center sections 80a, 80b, if variable motor speed control or at least independent pontoon motor control is provided.

FIG. 7 also depicts an alternative possible configuration of a remote control unit 300. Again, the unit contains the switches 330, 340 but switch 330 could be configured as a five state switch such that joy stick 339 can be moved side to side in directions indicated by phantom arrows 333, 334, as well as front and back as indicated by arrows 331, 332, respectively. Switch 340 could be a three state switch and provided with a toggle or joy stick constrained, for example, to move forward and rearward in directions 341, 342 from a neutral upright or central position. Switch 330 would be used to control all directional movement of the vehicle 10 through the pontoon motors 130a, 130b. Switch 340 would be used solely to control the steering motor 50, for example, reconfiguring the vehicle 10 into the second operating configuration 14 when pushed in the forward direction 341 or into third operating configuration 16 when pushed in the rearward direction 342. In this configuration, the central processor 208 is configured to supply the appropriate current through the motor control circuits 206a, 206b to rotate the pontoon center sections 80a, 80b in the appropriate opposing rotational directions to propel the vehicle 10 in a forward direction as indicated by arrow 371 in FIG. 8a or a rearward direction as indicated by arrow 372 in FIG. 8b in response to movement of the joystick 339 in the forward or rearward directions 331, 332, respectively. The processor 208 would further be configured to supply current to rotate the pontoon center portions 80a, 80b in the same rotational directions as indicated in FIGS. 8c and 8d, in response to movement of the joystick 339 in either side direction 333, 334. This configuration does not provide separate or independent operator control of each of the pontoon motors 130a, 130b.

In operation, the screw drive vehicle 10 is adapted to travel over a wide range of surfaces. The pontoons 70 are preferably essentially sealed and give the screw drive vehicle 10 sufficient buoyancy to float. Thus configured, the screw drive vehicle 10 can operate on either land or water. The vehicle 10 exhibits very different response, depending upon the nature of the surface supporting the vehicle 10, from rotating the pontoon center portions 80a, 80b in the same rotational directions as indicated in FIGS. 8c and 8d. When the pontoon center portions 80a, 80b are both rotated in the counterclockwise direction (viewed from aft end 24) as shown in FIG. 8c, on a relatively soft support surface (e.g. carpeting, sand, grass, loose dirt or snow), the vehicle 10 generally rotates in place in a clockwise direction (when viewed from above) as indicated by arrow 373 in FIG. 8c and, on a relatively hard surface (e.g. a wooden or tile floor, hard dirt, concrete or asphalt), moves laterally to its left, in a sideways direction as indcted by left pointing phantom arrow 374 in FIG. 8c. When the pontoon center portions 80a, 80b are rotated in the clockwise direction (when viewed from the aft end as indicated in FIG. 8d), the vehicle 10 generally rotates in place in a counterclockwise direction in place as indicated by arrow 375 on a relatively soft surface and moves laterally to the right as indicated by phantom arrow 376 in FIG. 8d on a relatively hard surface.

Figure 9A:
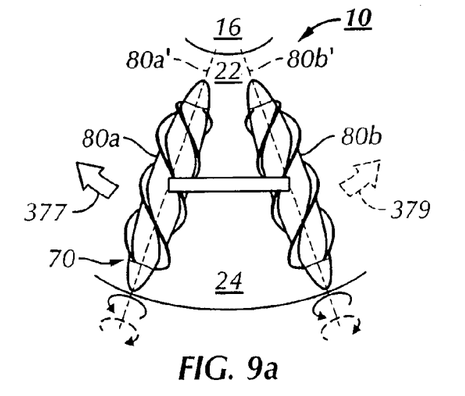
FIGS. 9a and 9b are schematic drawings showing movement of the vehicle for different orientations of the angular positions of the pontoons.
Figure 9B:
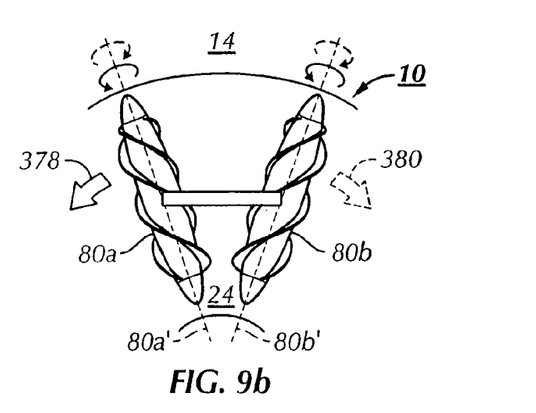

The effect of operation of steering motor 50 and the operating configuration 12, 14 or 16 of vehicle 10 is relatively insignificant when the vehicle 10 is commanded to move in a forward or rearward direction 371 or 372 by rotating the pontoon center sections 80a, 80b in opposite relative directions (as indicated in FIGS. 8a and 8b), regardless of the support surface. The effect of the steering control feature is most significant when the vehicle 10 is commanded to move or turn left or right by driving the pontoon center sections in the same relative (clockwise or counterclockwise) direction, particularly on a relatively hard surface. More specifically, when transformed into the third operating configuration 16 of FIGS. 2 and 9a, and the center portions 80a, 80b are rotated in the same relative direction e.g., counterclockwise when viewed from the aft end 24, as indicated in FIG. 9a, on a relatively hard surface, the vehicle 10 moves in a large circular motion as indicated by solid arrow 377 with the forward end 22 of the vehicle 10 pointing to the center of the circle. Similarly, when the vehicle 10 is transformed into the second configuration 14 as shown in FIGS. 2 and 9b, and the pontoon center sections 80a, 80b are driven in the same counterclockwise direction (when viewed from the aft end 24), vehicle 10 tends to move in an enlarged circle in a counterclockwise direction (when viewed from above) as indicated by solid arrow 378 in FIG. 9b with the rearward end 24 of the vehicle 10 pointed inwardly towards the center of the circle. Reversing the direction of rotation of the pontoon center portions 80a, 80b (i.e. clockwise when viewed from the aft end 24) causes the enlarged circular movement of the vehicle in the opposite direction as indicated by phantom arrows 379 and 380 in FIGS. 9a and 9b, respectively. On a loose or relatively soft surface, the vehicle tends to rotate in place as indicated by arrows 373 and 375 in FIGS. 8c and 8d, respectively, in all three configurations 12, 14 and 16 of the vehicle 10. The vehicle 10 operates in water similarly to the manner in which it operates on "loose" or relatively soft surfaces.

From the foregoing it can be seen that the present invention comprises a screw drive vehicle having new steering and drive mechanisms. In a preferred embodiment, the screw drive vehicle is of compact size and is capable of being remotely controlled, making the screw drive vehicle especially desirable for use as a toy.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A screw drive vehicle comprising:
   a main housing having a forward end and an aft end, first and second lateral sides and a central longitudinal axis extending through the forward and aft ends;
   at least one electric power source supported by the main housing;
   a first pontoon assembly having a central longitudinal axis;
   a first support arm connecting the first pontoon assembly to the first lateral side of the main housing;
   a second pontoon assembly having a central longitudinal axis; and
   a second support arm connecting the second pontoon assembly to the second lateral side of the main housing;
   each pontoon assembly including:
      a rotatable housing supported for rotation by the support arm and having at least one screw thread extending generally radially outwardly from an exterior surface of the housing; and
      a reversible, electrically powered pontoon drive motor operably coupled to the at least one electric power source and operably coupled with the rotatable housing so as to rotate the rotatable housing with the at least one screw thread together in a selected rotational direction, each pontoon drive motor being operable separately from the other pontoon drive motor;
   wherein:

each support arm further includes a forward end and an aft end; and each rotatable housing is rotatably supported between the forward and aft support arm ends; and each pontoon drive motor is supported within the rotatable housing.

2. The screw drive vehicle of claim 1, wherein each pontoon assembly further comprises a pontoon gear drive train within the pontoon operably coupling the pontoon drive motor with the rotatable housing such that the rotatable housing may be rotated by the pontoon drive motor.

3. The screw drive vehicle of claim 1, wherein the pontoon drive motor is fixedly and non-rotatably connected to the support arm and housed within the rotatable housing.

4. The screw drive vehicle of claim 1, wherein the first and second pontoon assemblies are generally water resistant and of sufficient size to provide sufficient buoyancy to allow the screw drive vehicle to float on water on the pontoon assemblies.

5. The screw drive vehicle of claim 1, wherein each pontoon drive motor is non-rotatably supported between the forward and aft support arm ends within the rotatable housing.

6. The screw drive vehicle of claim 1, wherein the first and second support arms are each rotatably connected to the main housing.

7. The screw drive vehicle of claim 6 having:

a first operating configuration wherein the central longitudinal axes of the first and second pontoon assemblies are generally parallel to the central longitudinal axis of the main housing;

a second operating configuration wherein the central longitudinal axes of the first and second pontoon assemblies are angled with respect to the central longitudinal axis of the main housing and with respect to one another such that the central longitudinal axes of the first and second pontoon assemblies intersect at a point aft of the aft end of the main housing; first and second pontoon assemblies intersect at a point aft of the aft end of the main housing: and a third operating configuration wherein the central longitudinal axes of the first and second pontoon assemblies are angled with respect to the central longitudinal axis of the main housing and with respect to one another such that the central longitudinal axes of the first and second pontoon assemblies intersect at a point forward of the forward end of the main housing.

8. The screw drive vehicle of claim 7, wherein the central longitudinal axes of the first and second pontoon assemblies in the second and third operating configurations intersect at points along the central longitudinal axis of the main housing in top plan view.

9. The screw drive vehicle of claim 7, further comprising a steering motor supported by the main housing and operably coupled to the at least one electric power source and with the first and second support arms.

10. The screw drive vehicle of claim 9, further comprising a first steering gear drive system operatively coupling the first support arm and steering motor.

11. The screw drive vehicle of claim 9, further comprising a second steering gear drive system operatively coupling the second support arm and the steering motor.

12. The screw drive vehicle of claim 9, further comprising control circuitry including a wireless signal receiver operatively connected to the at least one electrical power source, wherein the control circuitry with receiver selectively operably couples the at least one electrical power source with each of the first and second pontoon drive motors and the steering motor.

13. The screw drive vehicle of claim 12, wherein the control circuitry is configured to provide reversible current through each pontoon motor independently of one another.

14. The screw drive vehicle of claim 1, further comprising control circuitry including a wireless signal receiver operatively connected to the at least one electrical power source, wherein the control circuitry with receiver selectively operably couples the at least one electrical power source with each of the first and second pontoon drive motors.

15. A screw drive vehicle comprising:

a main housing having a forward end and an aft end, first and second lateral sides and a central longitudinal axis between the forward and aft ends;

at least one electric power source;

a first pontoon assembly having forward and aft ends, a central longitudinal axis and a rotatable housing having at least one screw thread extending generally radially outwardly from an exterior surface of the rotatable housing;

a first support arm connecting the first pontoon assembly to the first lateral side of the main housing, the first support arm having a pivot point and being capable of moving the first pontoon assembly from a position parallel to the central longitudinal axis of the main housing to a non-parallel position;

a second pontoon assembly having forward and aft ends, a central longitudinal axis and a rotatable housing having at least one screw thread extending generally radially outwardly from an exterior surface of the rotatable housing;

a second support arm connecting the second pontoon assembly to the second lateral side of the main housing, the second support arm having a pivot point and being capable of moving the second pontoon assembly from a position parallel to the central longitudinal axis of the main housing to a non-parallel position; and at least one pontoon drive motor operably coupled with at least one of the first and second pontoon assemblies;

a steering motor supported by the main housing and operably coupled to the at least one electric power source and with the first and second support arms, wherein in the parallel positions of the first and second pontoon assemblies, the forward ends of the first and second pontoon assemblies define a forward plane perpendicular to the main housing central longitudinal axis and the aft ends of the pontoon assemblies define an aft plane perpendicular to the main housing central longitudinal axis and the first and second support arm pivot points are intermediate the forward and aft planes, and wherein the steering motor pivots the first and second support arms from a first operating configuration wherein the central longitudinal axes of the first and second pontoon assemblies are in the parallel positions generally parallel to the central longitudinal axis of the main housing to at least another operating configuration wherein the central longitudinal axes of the first and second pontoon assemblies intersect.

16. The screw drive vehicle of claim 15, wherein the first and second pontoon assemblies are generally water resistant and of sufficient size to provide sufficient buoyancy to allow the screw drive vehicle to float on water on the pontoon assemblies.

17. The screw drive vehicle of claim 15, further comprising a first steering gear drive system operatively coupling the first support arm and steering motor.

18. The screw drive vehicle of claim 15, further comprising a second steering gear drive system operatively coupling the second support arm and the steering motor.

19. The screw drive vehicle of claim 15, wherein the at least one screw thread extending generally radially outwardly from an exterior surface of the housing is fixed to the exterior surface to rotate with the rotatable housing.

20. The screw drive vehicle of claim 19, wherein each pontoon assembly includes a reversible, electrically powered pontoon drive motor fixedly and non-rotatably supported within the rotatable housing operably coupled with the at least one electric power source and operably coupled with the rotatable housing so as to rotate the housing in a selected rotational direction.

21. The screw drive vehicle of claim 20, wherein each pontoon assembly further comprises a pontoon gear drive train operably coupling the pontoon drive motor of the pontoon assembly with the rotatable housing of the pontoon assembly such that the rotatable housing may be rotated by the pontoon drive motor.

22. The screw drive vehicle of claim 20, further comprising control circuitry including a wireless signal receiver, wherein the control circuitry selectively operably couples the at least one electrical power source with each of the first and second pontoon drive motors and the steering motor in response to signals from the receiver.

23. The screw drive vehicle of claim 22, wherein the control circuitry is configured to provide reversible current through each pontoon motor independently of one another.

24. The screw drive vehicle of claim 15, wherein the at least one pontoon drive motor is supported within the rotatable housing.

* * * * *